United States Patent
Chen et al.

(10) Patent No.: US 10,809,925 B2
(45) Date of Patent: Oct. 20, 2020

(54) CONFIGURABLE SECURITY MEMORY REGION

(71) Applicant: MACRONIX INTERNATIONAL CO., LTD., Hsinchu (TW)

(72) Inventors: Ken-Hui Chen, Hsinchu (TW); Kuen-Long Chang, Taipei (TW); Chin-Hung Chang, Tainan (TW); Yu-Chen Wang, Kaohsiung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 16/259,268

(22) Filed: Jan. 28, 2019

(65) Prior Publication Data
US 2020/0241768 A1  Jul. 30, 2020

(51) Int. Cl.
*G06F 3/06* (2006.01)
*G06F 12/14* (2006.01)

(52) U.S. Cl.
CPC .......... *G06F 3/0622* (2013.01); *G06F 3/0637* (2013.01); *G06F 12/1408* (2013.01); *G06F 12/1458* (2013.01)

(58) Field of Classification Search
CPC ............. G06F 12/1458; G06F 12/1408; G06F 3/0622; G06F 3/0637
USPC .......................................................... 711/163
See application file for complete search history.

(56) References Cited

U.S. PATENT DOCUMENTS

| | | | |
|---|---|---|---|
| 7,934,049 B2 | 4/2011 | Holtzman et al. | |
| 8,473,754 B2 | 6/2013 | Jones et al. | |
| 9,256,551 B2 | 2/2016 | Paaske et al. | |
| 9,720,700 B1* | 8/2017 | Brown | H04L 9/0891 |
| 9,959,418 B2 | 5/2018 | Bhattacharyya et al. | |
| 2007/0247905 A1 | 10/2007 | Rudelic | |
| 2018/0196956 A1* | 7/2018 | Mishra | G06F 21/79 |

FOREIGN PATENT DOCUMENTS

| TW | 200731108 A | 8/2007 |
|---|---|---|
| TW | 201512839 A | 4/2015 |
| TW | I545436 B | 8/2016 |
| TW | 201717030 A | 5/2017 |

OTHER PUBLICATIONS

TW Action in TW10820778080 dated Aug. 17, 2020, 8 pages.

* cited by examiner

*Primary Examiner* — Hua J Song
(74) *Attorney, Agent, or Firm* — Haynes Beffel & Wolfeld LLP

(57) ABSTRACT

A memory device comprises a memory array with I/O path and security circuitry coupled to the I/O path of the memory array. The memory device comprises control circuitry, responsive to configuration data, to invoke the security circuitry. The memory device comprises a configuration store, storing the configuration data accessible by the control circuitry to specify location and size of a security memory region in the memory array. Responsive to an external command and the configuration data, the control circuitry can be configured to invoke the security circuitry on an operation specified in the external command in response to accesses into the security memory region, or to not invoke the security circuitry in response to accesses to outside the security memory region.

18 Claims, 4 Drawing Sheets ated as the security memory region.
CONFIGURABLE SECURITY MEMORY REGION

BACKGROUND

Field

The present invention relates to high density memory devices, and particularly to memory devices including security regions.

Description of Related Art

Memories, including flash memories, can include a security region protected by security measures and a normal region not protected by security measures. A memory including a security region and a normal region may or may not be suitable for applications with varying requirements for the size of a security region and the size of a normal region. In other words, a security region of a memory may not meet the requirements of applications for a larger security region or a larger normal region than how the memory is manufactured.

It is desirable to provide technologies for a memory having a flexible security region and a flexible normal region.

SUMMARY

A memory device comprises a memory array with I/O path and security circuitry coupled to the I/O path of the memory array. The memory device comprises control circuitry, responsive to configuration data, to invoke the security circuitry. The memory device comprises a configuration store, storing the configuration data accessible by the control circuitry to specify location and size of a security memory region in the memory array. Responsive to an external command and the configuration data, the control circuitry can be configured to invoke the security circuitry on an operation specified in the external command in response to accesses into the security memory region, or to not invoke the security circuitry in response to accesses to outside the security memory region.

The security circuitry includes authentication circuitry to authenticate access to the security memory region. The security circuitry is configured to invoke the authentication circuitry before executing a decryption operation or an encryption operation in the security memory region. The security circuitry is configured to invoke the authentication circuitry before executing an erase operation in the security memory region.

The operation specified in the external command can include a program operation, and the security circuitry includes decryption circuitry to execute a decryption operation on data in the I/O path for the program operation to program decrypted data in the security memory region.

The operation specified in the external command can include a read operation, and the security circuitry includes encryption circuitry to execute an encryption operation on data in the I/O path from the security memory region for the read operation to provide encrypted data to a host external to the memory device.

The size of the security memory region specified by the configuration data can indicate a fraction of the memory array configured as the security memory region.

The control circuitry is configured to retrieve the configuration data stored in the configuration store. The external command specifies address information for the operation specified in the external command, and the control circuitry is configured to determine the accesses into the security memory region using the address information and the configuration data.

A method is provided for operating a memory device comprising a memory array with I/O path, and security circuitry coupled to the I/O path of the memory array.

The method comprises, responsive to configuration data, invoking the security circuitry; and storing the configuration data in a configuration store accessible by the control circuitry to specify location and size of a security memory region in the memory array. The method can comprise, responsive to an external command and the configuration data, invoking the security circuitry on an operation specified in the external command in response to accesses into the security memory region, or not invoking the security circuitry in response to accesses to outside the security memory region.

The method comprises authenticating access to the security memory region. The method comprises executing said authenticating access to the security memory region before executing a decryption operation or an encryption operation in the security memory region. The method comprises executing said authenticating access to the security memory region before executing an erase operation in the security memory region.

The operation specified in the external command can include a program operation. The method can comprise executing a decryption operation on data in the I/O path for the program operation, and programming decrypted data in the security memory region. The method can comprise The operation specified in the external command can include a read operation. The method can comprise executing an encryption operation on data in the I/O path from the security memory region for the read operation, and providing encrypted data to a host external to the memory device.

The size of the security memory region specified by the configuration data can indicate a fraction of the memory array configured as the security memory region.

The method comprises retrieving the configuration data stored in the configuration store. The external command specifies address information for the operation specified in the external command. The method comprises determining the accesses into the security memory region using the address information and the configuration data.

Other aspects and advantages of the present invention can be seen on review of the drawings, the detailed description and the claims, which follow.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Figure 1:
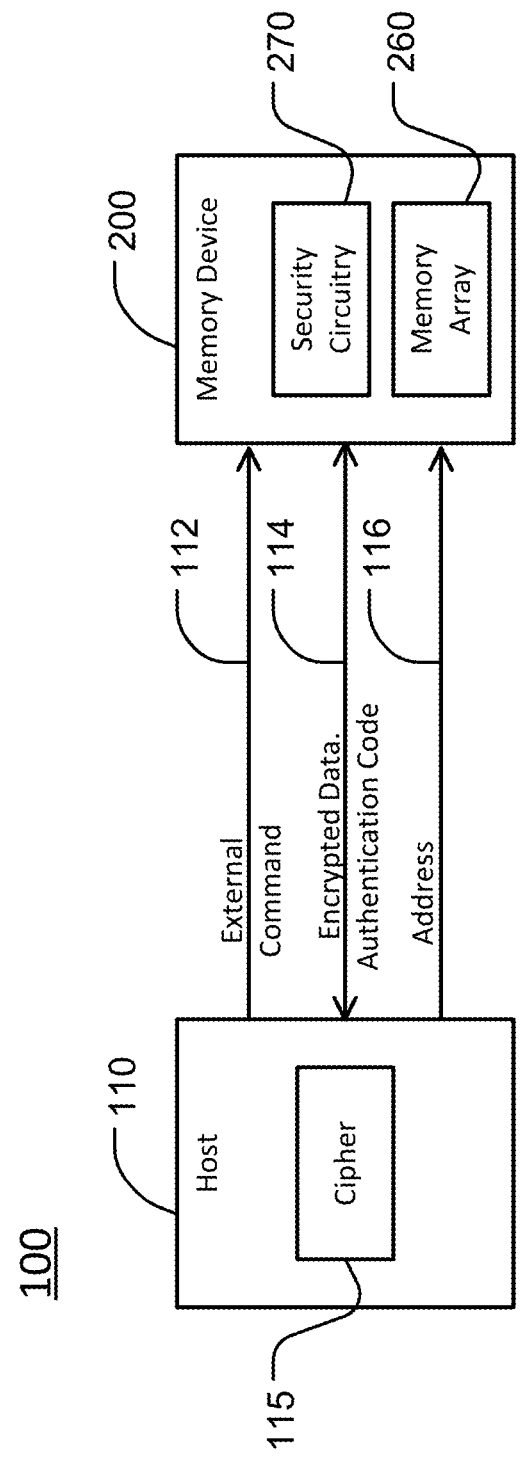
FIG. 1 is a system diagram illustrating a system including a host and a memory device coupled to the host.

FIG. 1 is a system diagram illustrating a system including a host and a memory device coupled to the host according to an embodiment of the present technology. As shown in FIG. 1, a system 100 includes a host 110 and a memory device 200 coupled to the host 110, via lines that carry an external command 112, data and address. The host 110 can issue an external command 112 to the memory device 200. The external command 112 can specify an operation, such as a read, program or erase operation. For a program operation, the memory device 200 can receive encrypted data and an authentication code 114 from the host 110. For a read operation, the memory device 200 can provide encrypted data and an authentication code to the host 110. The host 110 can provide address 116 to the memory device 200 for the corresponding operation.

The host 110 can include a cipher 115, for example, an AES (Advanced Encryption Standard) for encryption or decryption using a first secret key. The host 110 can encrypt data (i.e., plaintext in cryptography) into encrypted data (i.e., ciphertext in cryptography) using the AES with the first secret key. The AES defines a number of cipher transformations that are to be performed on the plaintext. The cipher transformations are repeated over a number of encryption rounds. The number of rounds is determined by the key length of the first secret key, for example, with 10 rounds for 128-bit keys, 12 rounds for 192-bit keys and 14 rounds for 256-bit keys.

The host 110 can generate the authentication code on the encrypted data (i.e., ciphertext), and not on the plaintext, using a second secret key different than the first secret key. The host 110 can send the authentication code to the memory device 200.

Figure 2:
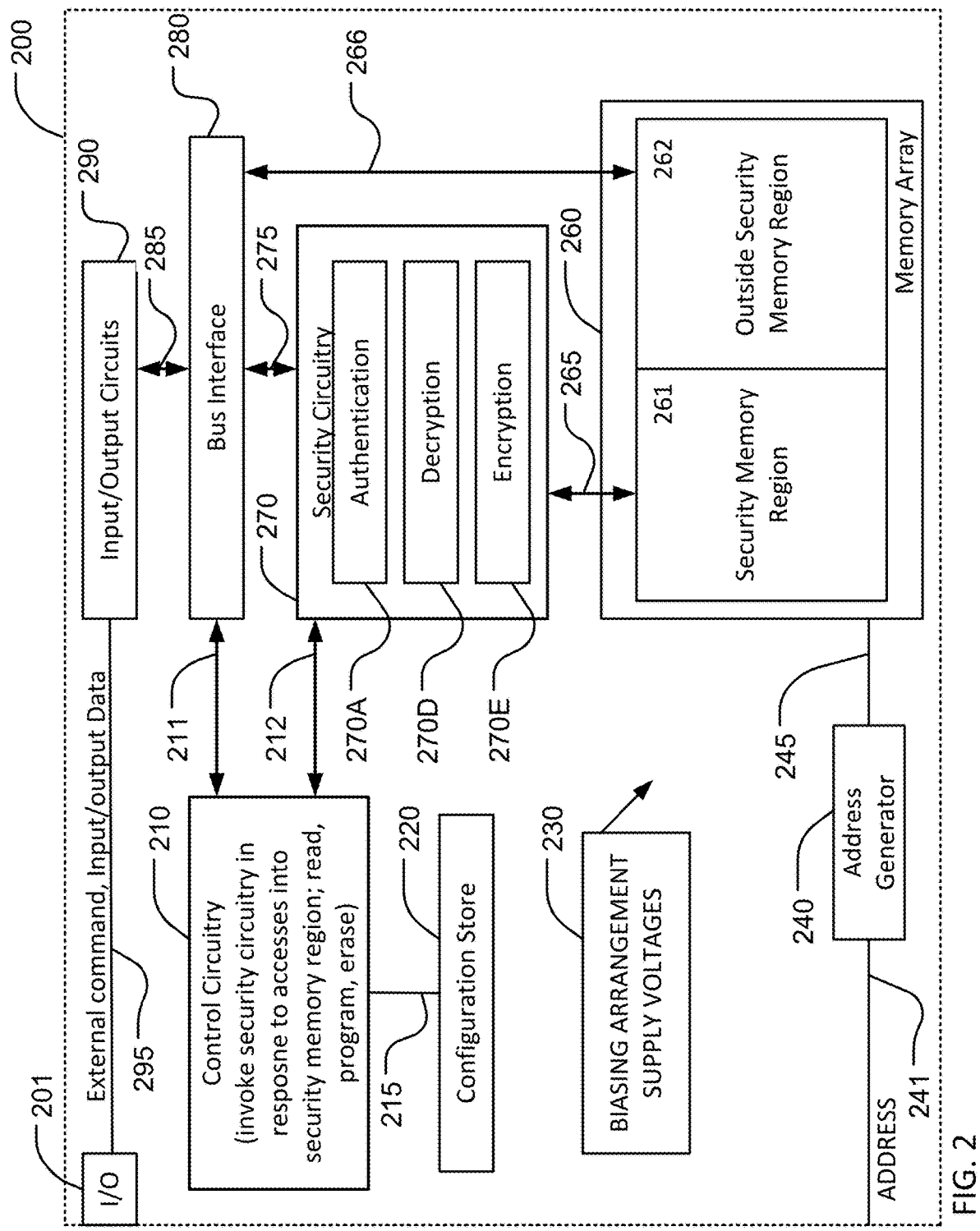
FIG. 2 is a simplified chip block diagram of an integrated circuit memory device according to an embodiment.

The memory device 200 includes security circuitry 270, and a memory array 260 including a security memory region (261, FIG. 2). For an operation in the security memory region 261 of the memory array 260, the security circuitry 270 first authenticates the access to the security memory region 261 in the memory device 200, using the authentication code received from the host 110 with the second secret key. If the authentication is passed, the security circuitry 270 can hence execute a decryption operation for a program operation or an encryption operation for a read operation in the security memory region 261, accordingly.

The external command 112 specifies address information for the operation specified in the external command 112. The memory device 200 includes a configuration store, storing configuration data to specify location and size of the security memory region 261. The security circuitry 270 authenticates the access to the security memory region 261 using the address information and the configuration data.

For a program operation on the encrypted data from the host 110, a decryption operation can be executed on the encrypted data from the host 110 by security circuitry 270. The decrypted data can then be programmed in the security memory region (261, FIG. 2) in the memory array 260. For a read operation on the decrypted data stored in the security memory region 261 in the memory device 200, an encryption operation can be executed on the decrypted data by the security circuitry 270. The encrypted data can then be provided to the host 110 external to the memory device 200.

FIG. 2 is a simplified chip block diagram of an integrated circuit memory device 200 according to an embodiment of the present technology. A memory device 200 includes a memory array 260 with I/O path and security circuitry 270 coupled to the I/O path of the memory array 269 via lines 265. The memory device 200 includes control circuitry 210, responsive to an external command 112 and configuration data, to invoke the security circuitry 270 on an operation specified in the external command 112 in response to accesses into a security memory region 261 in the memory array 260, or to not invoke the security circuitry 270 in response to accesses to outside the security memory region 262. As shown in FIG. 2, the control circuitry 210 is coupled to the security circuitry 270 via lines 212.

The external command 112 is received on input/output lines 295. Input data is supplied via the input/output lines 295 from input/output ports 201 on the memory device 200 or from other data sources internal or external to the memory device 200, such as a general purpose processor or special purpose application circuitry, or a combination of modules providing system-on-a-chip functionality supported by the memory array 260, to the input/output circuits 290. Output data is provided to the input/output lines 295 by the input/output circuits 290.

A bus interface 280 is coupled to the control circuitry 210 via lines 211, coupled to the input/output circuits 290 via lines 285, coupled to the memory array 260 via lines 266, and coupled to the security circuitry 270 via lines 275. The I/O path includes the lines 265 coupled to the memory array 260 and to the security circuitry 270, and the lines 275 coupled to the security circuitry 270 and to the bus interface 280.

The memory device 200 comprises a configuration store 220, storing the configuration data accessible by the control circuitry 210 to specify location and size of the security memory region 261. The configuration store 220 is coupled to the control circuitry 210 via lines 215. The configuration store 220 can include a register storing the configuration data accessible by the control circuitry 210.

The security circuitry 270 includes authentication circuitry 270A to authenticate access to the security memory region 261. The security circuitry 270 is configured to invoke the authentication circuitry 270A before executing a decryption operation or an encryption operation in the security memory region 261. The security circuitry 270 is configured to invoke the authentication circuitry 270A before executing an erase operation in the security memory region 261.

The operation specified in the external command 112 can include a program operation, and the security circuitry 270 includes decryption circuitry 270D to execute a decryption operation on data in the I/O path for the program operation to program decrypted data in the security memory region 261.

The operation specified in the external command 112 can include a read operation, and the security circuitry 270 includes encryption circuitry 270E to execute an encryption operation on data in the I/O path from the security memory region 261 for the read operation to provide encrypted data to a host 110 external to the memory device 200.

The location of the security memory region 261 specified by the configuration data can indicate a boundary of the security memory region 261. The size of the security memory region 261 specified by the configuration data can indicate a fraction of the memory array 260 configured as the security memory region 261, as further described in reference to FIG. 4.

The control circuitry 210 is configured to retrieve the configuration data stored in the configuration store 220. The external command 112 specifies address information for the operation specified in the external command 112, and the control circuitry 210 is configured to determine the accesses into the security memory region 261 using the address information and the configuration data.

Addresses are supplied on bus 241 to an address generator 240 which can include word line and bit line decoders. The address generator 240 is coupled to lines 245, such as word lines and bit lines, for reading and programming data from the memory cells in the memory array 260.

In an embodiment shown in FIG. 2, control circuitry 210 using a bias arrangement state machine controls the application of biasing arrangement supply voltages 230, such as read and program voltages. The control circuitry 210 can include modes of operation for programming, reading and erasing memory cells. The control circuitry 210 can be implemented using special-purpose logic circuitry as known in the art. In some alternative embodiments, the control circuitry 210 comprises a general-purpose processor, which can be implemented on the same integrated circuit, which executes a computer program to control the operations of the device. In other alternative embodiments, a combination of special-purpose logic circuitry and a general-purpose processor can be utilized for implementation of the control circuitry 210.

Figure 3:
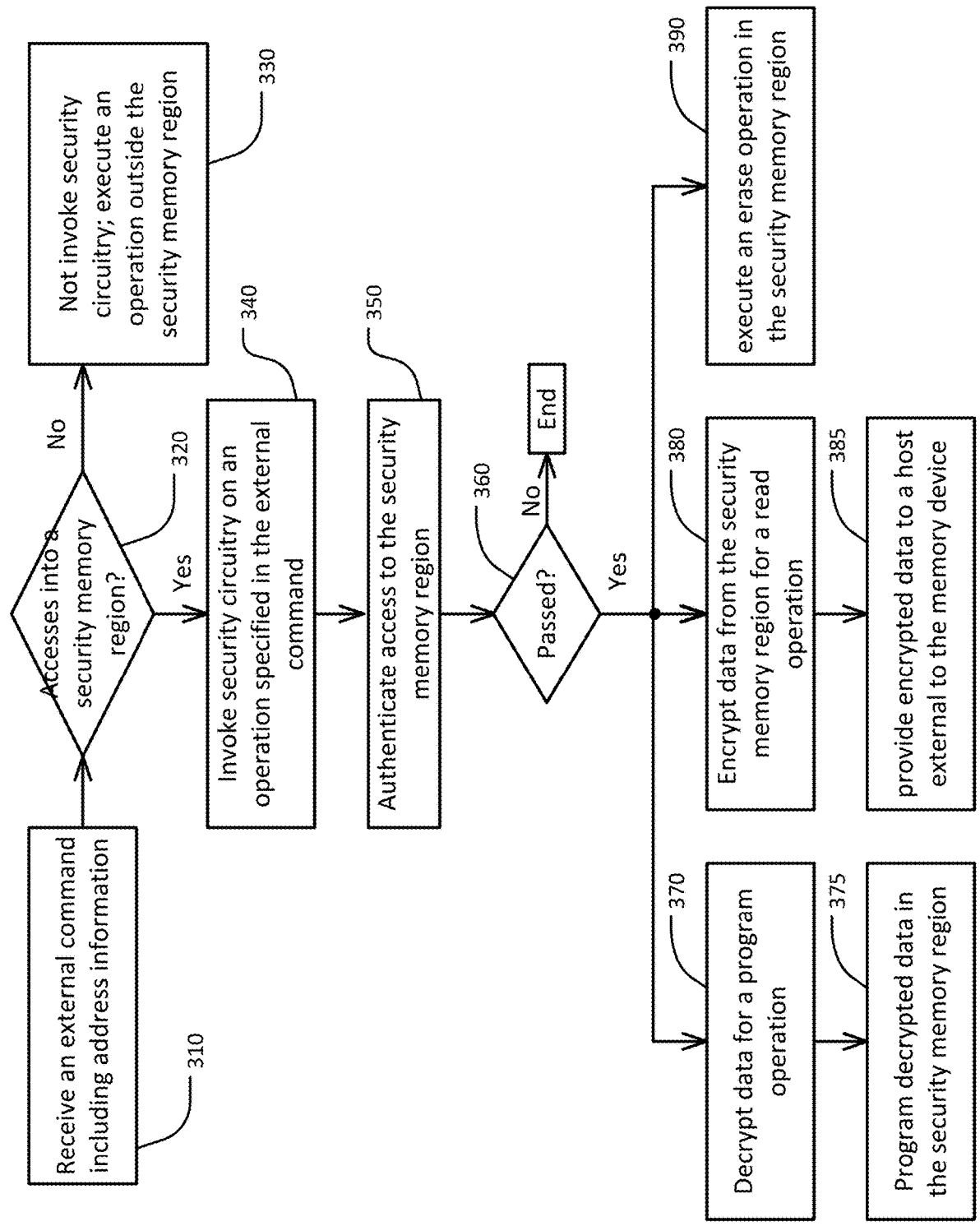
FIG. 3 is a simplified flowchart illustrating a flow for operating a memory device as described in reference to FIG. 2.

FIG. 3 is a simplified flowchart illustrating a flow for operating a memory device 200 as described in reference to FIG. 2. The memory device 200 includes a memory array 260 with I/O path, and security circuitry 270 coupled to the I/O path of the memory array 260.

At Step 310, an external command 112 is received on the memory device 200. The external command 112 includes address information for writing to or reading from the memory device 200.

At Step 320, the process determines whether the address information indicates accesses into a security region 261 in the memory device 200 or accesses to outside the security memory region 262 in the memory device 200. The determination can be made using the address information for the operation specified in the external command 112, and the configuration data stored in the configuration store (220, FIG. 2). The configuration data is accessible by the control circuitry 210. The control circuitry 210 can retrieve the configuration data from the configuration store 220. The configuration data specifies location and size of the security memory region 261 in the memory device 200.

If the address information indicates accesses to outside the security memory region 262 in the memory device 200, the flow then proceeds to Step 330, and executes a program, read or erase operation outside the security memory region (262, FIG. 2) in the memory device 200. This operation bypasses the security circuitry 270, by sending data between the bus interface (280, FIG. 2) and outside the security memory region 262 via the lines (266, FIG. 2) coupling the bus interface 280 and outside the security memory region 262. If the address information indicates accesses into the security region 261 in the memory device 200, the flow then proceeds to Step 340.

At Step 330, the security circuitry 270 is not invoked, and a read, program or erase operation specified in the external command 112 can be executed outside the security memory region (262, FIG. 2) in the memory device 200.

At Step 340, the security circuitry 270 is invoked on a read, program, or erase operation specified in the external command 112. The flow then proceeds to Step 350.

At Step 350, authentication of the access to the security memory region 261 is executed, before a decryption operation, an encryption operation or an erase operation is executed in the security memory region 261. At Step 360, if the authentication is passed, the flow proceeds to Steps 370, 380, or 390 to execute a read, program or erase operation, respectively, according to the operation specified in the external command 112. If the authentication is not passed, the flow then ends.

At Step 370, for a program operation specified in the external command 112, a decryption operation is executed on data in the I/O path coupled to the security circuitry 270, using the decryption circuitry (270D, FIG. 2) in the security circuitry 270. At Step 375, the decrypted data is then programmed in the security memory region (261, FIG. 2) in the memory device 200, according to the address information specified in the external command 112.

At Step 380, for a read operation specified in the external command 112, an encryption operation is executed on data in the I/O path from the security memory region (261, FIG. 2) in the memory device 200, according to the address information specified in the external command 112. At Step 385, the encrypted data is then provided to a host 110 external to the memory device 200.

At Step 390, an erase operation is executed in the security memory region 261. For instance, an erase operation can be executed on blocks of 4 kB (kilobytes), 32 kB, and 64 kB.

Figure 4:
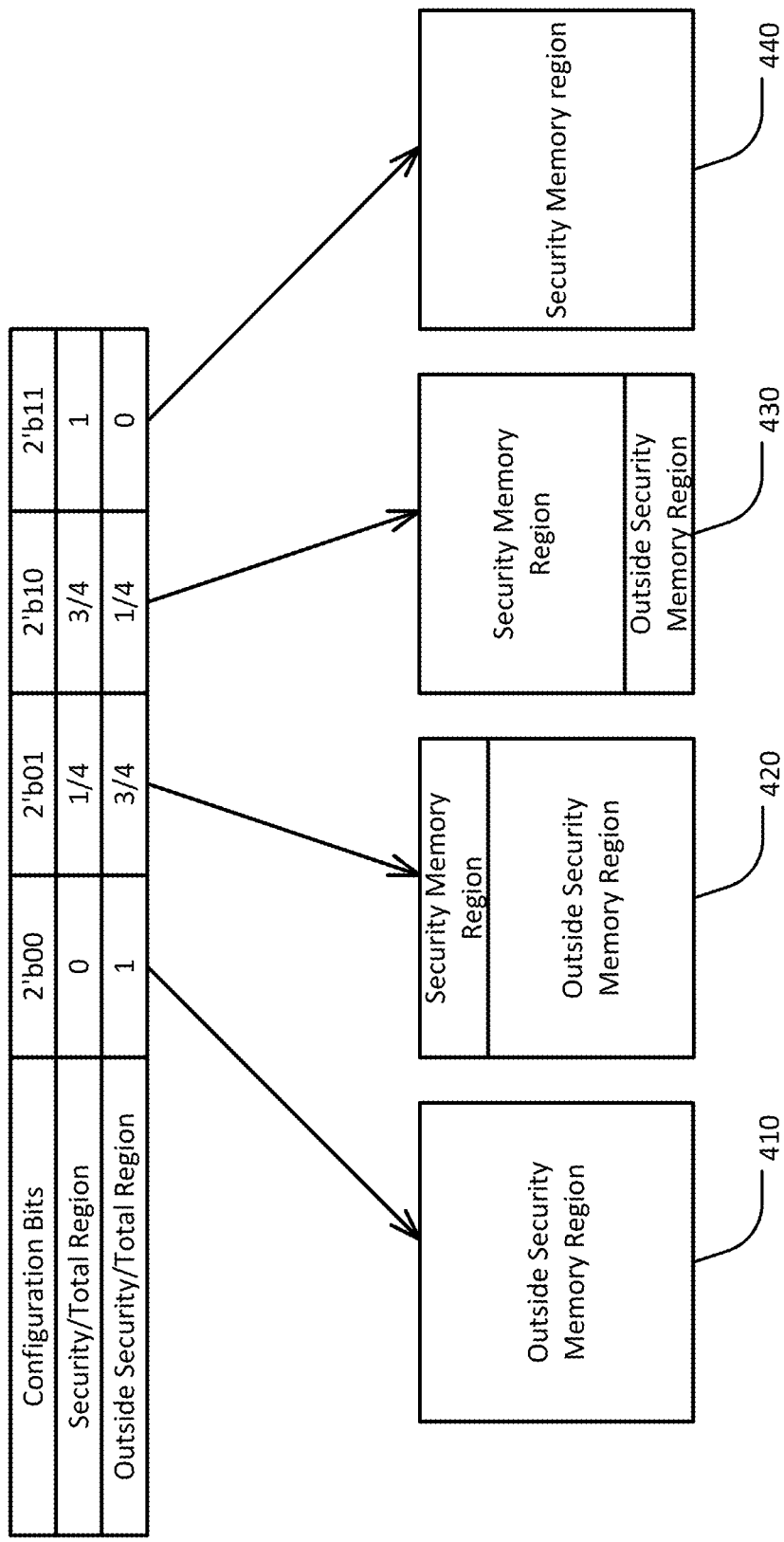
FIG. 4 is a diagram illustrating configuration of the security memory region.

FIG. 4 is a diagram illustrating configuration of the security memory region 261 according to an embodiment of the present technology. The configuration data stored in the configuration store (220, FIG. 2) can specify location and size of the security memory region 261. The size of the security memory region 261 specified by the configuration data stored in the configuration store (220, FIG. 2) can indicate a fraction of the memory array configured as the security memory region 261.

In one embodiment of the present technology, the configuration data can include a set of configuration bits. As shown in the example of FIG. 4, the set of configuration bits includes 2 configuration bits having four binary values 2'b00, 2'b01, 2'b10, and 2'b11. The four binary values can correspond to respective fractions of the security memory region 261 over the memory array which includes the security memory region 261 and outside the security memory region 262. For example, the binary values 2'b00, 2'b01, 2'b10, and 2'b11 can correspond to fractions of 0⁄4, ¼, ¾, and 4⁄4, respectively.

In this example, the binary value 2'b00 of the configuration bits specifies that the memory array has no security memory region (410). The binary value 2'b01 of the configuration bits specifies that ¼ of the memory array is configured as security memory region (420), or that ¾ of the memory array is configured as outside the security memory region. The binary value 2'b10 of the configuration bits specifies that ¾ of the memory array is configured as security memory region (430), or that ¼ of the memory array is configured as outside the security memory region. The binary value 2'b11 of the configuration bits specifies that all of the memory array is configured as the security memory region (440).

In an alternative embodiment of the present technology, the set of configuration bits can include more than 2 configuration bits, such as 3 or 4 bits, to specify more granularity for the size of the security memory region as a fraction of the memory array. For instance, a set of configuration bits including 3 configuration bits can have eight binary values 3'b000, 3'b001, 3'b010, 3'b011, 3'b100, 3'b101, 3'b110, and 3'b111, correspond to fractions of ⁰⁄₈, ⅛, ⅔₈, ⅜, ⅝, ⅔₈, ⅞, and ⅝ respectively, indicating a fraction of the memory array configured as the security memory region.

The location specified in the configuration data stored in the configuration store can indicate a boundary of the security memory region. For instance, a memory array can have addresses starting at a base address 0. The boundary can indicate the starting address for the security memory region, which can be the base address 0 of the memory array or an address higher than the base address.

In one embodiment, the configuration data stored in the configuration store 220 can be specified in a test mode at factory, to specify the location and size of the security memory region 261. In an alternative embodiment, the configuration data stored in the configuration store 220 can be specified using a user command in a user mode when the memory device is released in the field, to specify the location and size of the security memory region 261. The location and size of the security memory region 261 specified in the test mode can be overwritten by the location and size of the security memory region 261 specified in the user mode in the field after factory release.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
a memory array with I/O path;
security circuitry coupled to the I/O path of the memory array;
a configuration store, storing configuration data to specify location and size of a security memory region in the memory array; and
control circuitry, responsive to an external command with address information and to the configuration data, to invoke the security circuitry in dependence on an operation identified in the command, the address information and the security memory region specified in the configuration data.

2. The memory device of claim 1, wherein the control circuitry, responsive to an external command and the configuration data, is configured to not invoke the security circuitry in response to accesses to outside the security memory region.

3. The memory device of claim 1, wherein the security circuitry includes authentication circuitry to authenticate access to the security memory region.

4. The memory device of claim 3, wherein the security circuitry is configured to invoke the authentication circuitry before executing a decryption operation or an encryption operation in the security memory region.

5. The memory device of claim 3, wherein the security circuitry is configured to invoke the authentication circuitry before executing an erase operation in the security memory region.

6. The memory device of claim 1, wherein the operation specified in the external command includes a program operation, and the security circuitry includes decryption circuitry to execute a decryption operation on data in the I/O path for the program operation to program decrypted data in the security memory region.

7. The memory device of claim 1, wherein the operation specified in the external command includes a read operation, and the security circuitry includes encryption circuitry to execute an encryption operation on data in the I/O path from the security memory region for the read operation to provide encrypted data to a host external to the memory device.

8. The memory device of claim 1, wherein the size of the security memory region specified by the configuration data indicates a fraction of the memory array configured as the security memory region.

9. The memory device of claim 1, wherein the control circuitry is configured to retrieve the configuration data stored in the configuration store.

10. A method for operating a memory device comprising a memory array with I/O path, and security circuitry coupled to the I/O path of the memory array, the method comprising:
responsive to an external command with address information and to configuration data, invoking the security circuitry in dependence on an operation specified in the external command, the address information and a security memory region specified in configuration data;
storing the configuration data in a configuration store to specify location and size of a security memory region in the memory array.

11. The method of claim 10, the method comprising:
responsive to the external command and the configuration data, not invoking the security circuitry in response to accesses to outside the security memory region.

12. The method of claim 10, the method comprising:
upon invoking the security circuitry, authenticating access to the security memory region.

13. The method of claim 12, the method comprising:
executing said authenticating access to the security memory region before executing a decryption operation or an encryption operation in the security memory region.

14. The method of claim 12, comprising:
executing said authenticating access to the security memory region before executing an erase operation in the security memory region.

15. The method of claim 10, wherein the operation specified in the external command includes a program operation, the method comprising:
executing a decryption operation on data in the I/O path for the program operation; and
programming decrypted data in the security memory region.

16. The method of claim 10, wherein the operation specified in the external command includes a read operation, the method comprising:
executing an encryption operation on data in the I/O path from the security memory region for the read operation; and
providing encrypted data to a host external to the memory device.

17. The method of claim 10, wherein the size of the security memory region specified by the configuration data indicates a fraction of the memory array configured as the security memory region.

18. The method of claim 10, comprising:
retrieving the configuration data stored in the configuration store.

* * * * *